US006465756B2

(12) United States Patent
Tanaka et al.

(10) Patent No.: US 6,465,756 B2
(45) Date of Patent: Oct. 15, 2002

(54) METHOD AND APPARATUS FOR ENGRAVING

(75) Inventors: Yasuhiro Tanaka; Shosuke Miyaki; Tetsuo Yano, all of Tokyo (JP)

(73) Assignee: Ando Electric Co., Inc., Tokyo (JP)

( * ) Notice: Subject to any disclaimer, the term of this patent is extended or adjusted under 35 U.S.C. 154(b) by 31 days.

(21) Appl. No.: 09/790,534

(22) Filed: Feb. 23, 2001

(65) Prior Publication Data

US 2001/0019046 A1 Sep. 6, 2001

(30) Foreign Application Priority Data

Feb. 28, 2000 (JP) ....................................... 2000-052562

(51) Int. Cl.[7] ................................................ B23K 26/00

(52) U.S. Cl. ................................ 219/121.6; 219/121.85

(58) Field of Search ......................... 219/121.6, 121.85, 219/68; 358/296, 299; 30/164.9; 101/3.1, 32

(56) References Cited

U.S. PATENT DOCUMENTS 4,275,768 A * 6/1981 Riggs et al. ................ 138/104
4,352,973 A * 10/1982 Chase ...................... 219/212.6
4,559,115 A * 12/1985 Inoue ...................... 204/129.1
4,733,049 A 3/1988 Lemelson
5,051,558 A * 9/1991 Sukhman ............... 219/121.68
5,164,140 A * 11/1992 Siano ......................... 265/255
5,229,861 A * 7/1993 Nozaka et al. .............. 358/299
5,603,850 A * 2/1997 Holt ............................ 219/68
6,023,849 A * 2/2000 Montes ........................ 33/392
6,099,177 A * 8/2000 Ito ............................. 400/132

FOREIGN PATENT DOCUMENTS

DE 004224282 A1 * 1/1994 ............ 219/121.68
GB 1 362 484 8/1974

* cited by examiner

*Primary Examiner*—Samuel M. Heinrich
(74) *Attorney, Agent, or Firm*—Burns, Doane, Swecker & Mathis, L.L.P.

(57) ABSTRACT

A laser beam 7 from an engravement portion softening mechanism 6 of an apparatus is condensed onto an engravement portion on an engravement surface of a workpiece 1 for softening the engravement portion. When the hardness of the engravement portion is lowered, a pen tip 2 of the apparatus is applied to the engravement portion. Thus, it is possible to reduce reliably wear and damage of the pen tip 2 which results from engraving a hard workpiece, and to prolong the useful life of the pen tip 2, so that the durability and the reliability of the apparatus are improved.

8 Claims, 2 Drawing Sheets

METHOD AND APPARATUS FOR ENGRAVING

BACKGROUND OF THE INVENTION

This application claims priority under 35 U.S.C. §§119 and/or 365 to 2000-052562 filed in Japan on Feb. 28, 2000; the entire content of which is hereby incorporated by reference.

1. Field of the Invention

The present invention relates to a method for engraving characters, such as an identification number or name, into a surface of a workpiece made of a metal, and relates to an apparatus for achieving the method. More particularly, this invention relates to a method and an apparatus preferable for engraving on a workpiece having the same or the larger degree of hardness as that of a pen tip of the apparatus.

2. Description of Related Art

The prior art of an apparatus for engraving described above is disclosed, for example, in Japanese Examined Patent Application, Second Publication No. Hei 03-27398.

This apparatus is provided with a compression controller device which regulates an air pressure so that a pen tip of the apparatus can maintain a constant compression pressure applied to an engravement surface of a workpiece, in order to prevent a possibility of mis-engraving desired figures of characters, such as identification numbers or names, because of the variations in the compression pressure of the pen tip (stylus) for engraving between the shallow portions and the deep portions of an engraved region in case the region is large.

This apparatus can be used for a long time to engrave characters on a workpiece, if the workpiece has a lower hardness than that of the pen tip of the apparatus.

However, in case the apparatus of the prior art is applied to a workpiece having the same degree of hardness as that of the pen tip, a depth of indentation engraved by the apparatus on the workpiece is possible to a degree of only a few tens of micrometers in general, and the pen tip is capable of about thirty thousand strikes, corresponding to about 200 words engraved by the apparatus. That is, in case the apparatus is used for engraving a workpiece having the same degree of hardness as that of the pen tip, the pen tip is worn down in a short period with the result that the resistance of the apparatus becomes significantly lowered.

BRIEF SUMMARY OF THE INVENTION

It is an object of the present invention to provide a method and an apparatus for engraving which can prevent a pen tip of the apparatus from being worn down in a short period so as to prolong the useful life of the apparatus, even if the apparatus is applied to a workpiece having the same or a greater degree of hardness as that of the pen tip.

In order to solve the problems described above, the present invention has provided the following methods and apparatuses.

A first aspect of the present invention provides a method which uses an apparatus comprising a pen, of which the tip is stricken against the workpiece for engraving characters, and a positioning unit for moving the pen tip to a position where the pen tip can engrave desired figures of characters into a portion of the workpiece to be engraved, wherein the portion of the workpiece is softened, preferably softened by irradiating a laser beam onto the portion, and then the pen tip is stricken against the workpiece in the softened state.

According to the first aspect described above, it is possible to reduce the wear and the damage of the pen tip which arise from friction between the workpiece and the pen tip by lowering the hardness of the portion to be engraved before applying the pen tip to the portion. Therefore, even if the hardness of the workpiece is the same or a larger degree than that of the pen tip, it is possible to prevent wear and damage of the pen tip in a short period of time, so as to prolong the useful life of the pen tip and to improve the durability and the reliablity of the apparatus.

A second aspect of the present invention provides an apparatus for engraving, which includes a pen, of which the tip is stricken to a portion of a workpiece to be engraved, a positioning unit for moving the pen tip on a surface of the workpiece, and an engravement portion softening device which lowers the hardness of the portion of a workpiece to be engraved.

In the second aspect, because this apparatus is equipped with the engravement portion softening device so as to soften the portion of the workpiece to be engraved, even if the workpiece has the same or a larger degree of hardness as the pen tip of the apparatus, it is possible to lower the hardness of the portion before the pen tip is stricken to the portion which is to be engraved. Thus, it is possible to reduce reliably the wear and the damage of the pen tip caused from friction between the pen tip and the workpiece, so as to prolong the useful life of the pen tip, and then to achieve the first aspect described above.

A third aspect of the present invention provides an apparatus for engraving, wherein the engravement portion softening device described above comprises either a first unit including a laser oscillator and a first optical system which condenses the laser beam irradiated from the laser oscillator onto the engravement portion of the workpiece, or a second unit including a laser oscillator and a second optical system which condenses the laser beam irradiated from the laser oscillator onto the engravement portion of the workpiece through an optical fiber.

In the third aspect, because the engravement portion softening device is equipped with either the first unit or the second unit described above, it is possible to soften reliably and easily the engravement portion of the workpiece by condensing the laser beam from the laser oscillator onto the engravement portion.

A forth aspect of the present invention provides an apparatus for engraving, wherein at least one of the laser oscillator, or the first or the second optical system described above is equipped to be moveable in an irradiation direction of the laser beam, and is provided a laser beam diameter controlling device which controls the diameter of the laser beam condensed onto the engravement portion of the workpiece.

In the fourth aspect, because the apparatus is constructed so as to be able to control the diameter of the laser beam condensed onto the engravement portion in accordance with the hardness and the thickness of the workpiece, even if the workpiece has the same or a larger degree of hardness as that of the pen tip of the apparatus, it is possible to reduce the wear and the damage of the pen tip arising from friction between the pen tip and the workpiece by decreasing the diameter of the laser beam. Thus, the pen tip of the apparatus enables prolonged use.

A fifth aspect of the present invention provides an apparatus for engraving, wherein the laser beam diameter controlling device includes a controller which automatically controls a position of the first or the second optical system described above.

In the fifth aspect, it is possible to control automatically the diameter of the laser beam condensed onto the engravement portion so as to soften the engravement portion with accuracy, by controlling the position of the first or the second optical system by means of the controller equipped with the apparatus.

BRIEF DESCRIPTIONS OF THE DRAWINGS

DETAILED DESCRIPTION OF THE INVENTION

Preferred embodiments of the present invention will be described below with reference to FIGS. 1 to 3. It should be understood, however, that the present invention is not limited by the following preferred embodiments, but any components and ideas of the embodiments may be freely combined.

Figure 1:
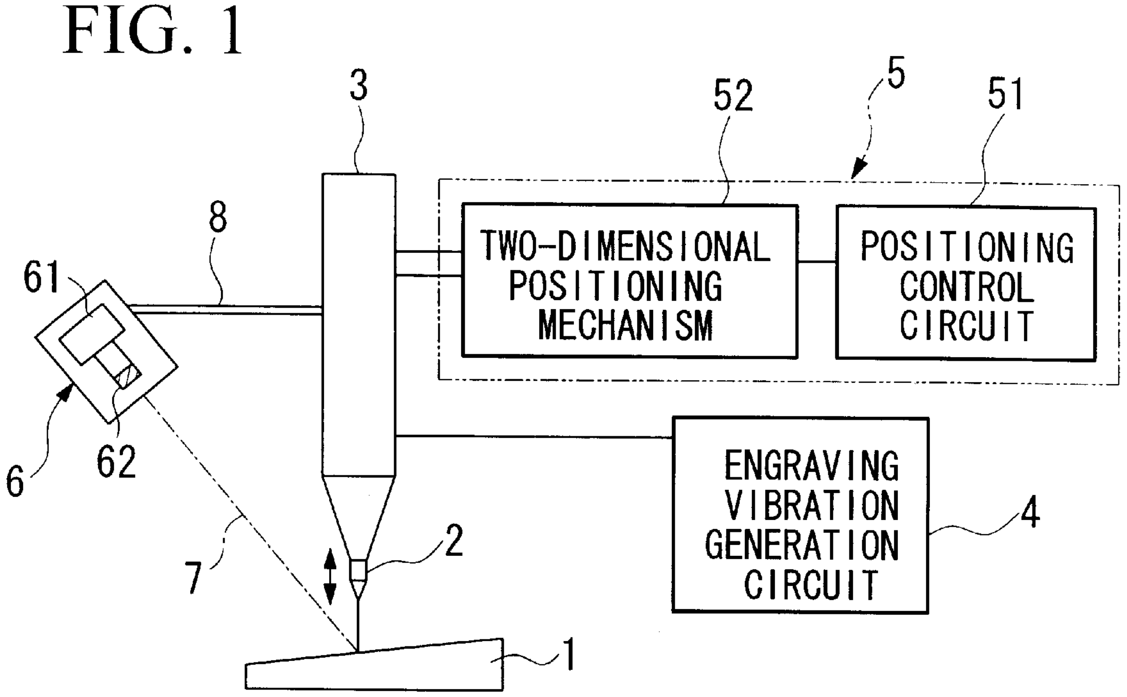
FIG. 1 is a block diagram showing one preferred embodiment of an apparatus for engraving according to the present invention.

FIG. 1 shows a first embodiment of an apparatus for engraving according to the present invention. This apparatus includes a pen 3. The pen 3 has a cylindrical shape, and is provided with a pen tip 2 at the tip end thereof so as to be vertically movable against a workpiece 1 to be engraved. The pen tip 2 is made of, for example, a super hard material such as a hard metal. The pen tip 2 is configured to be able to engrave characters on the engravement surface of the workpiece 1, when air is supplied inside of the pen 3 by means of an engraving vibration generator circuit 4 so as to cause the vertical movement (vibration) at a high speed against-and-towards the engravement surface which is to be engraved. That is, the pen tip 2 is constructed to vibrate in the direction that the tip portion of the pen tip 2 is separated from the engravement face and in the direction that the tip portion of the pen tip 2 approaches to the engravement surface. The engraving vibration generator circuit 4 is set to vibrate the pen tip 2, for example, approximately at a frequency of 300 Hz in this embodiment. The vibration frequency of the pen tip 2 may be selected suitably in accordance with the hardness of the workpiece 1.

This apparatus further includes a positioning unit 5 which moves the pen tip 2 in two-dimensional direction perpendicularly with the respect to the vibration direction of the pen 3 on the engravement surface of the workpiece 1 so that the pen tip 2 can engrave desired characters on the workpiece 1. The positioning unit 5 includes a positioning control circuit 51 and a two-dimensional positioning mechanism 52. The two-dimensional positioning mechanism 52 is configured to make the pen 3 move in the two-dimensional direction perpendicularly with the respect to the vibration direction of the pen 3 on the engravement surface of the workpiece 1 in accordance with a command from the positioning control circuit 51 during engraving. Thus, the positioning control circuit 51 controls a drive of the two-dimensional positioning mechanism 52 in accordance with a program previously input to the positioning control circuit 51. The positioning control circuit 51 includes a CPU and memories which can store programs.

Thus, when the pen tip 2 is applied to the engravement portion of the workpiece 1, the two-dimensional positioning mechanism 52 controlled by the positioning control circuit 51 controls a position of the pen 3 by moving it in the two-dimensional direction perpendicularly with the respect to the vibration direction of the pen 3 on the engravement surface so as to engrave characters, such as alphanumeric characters, having desired figures of two-dimensional patterns.

The apparatus is also provided an engravement portion softening mechanism 6 for softening the engravement portion of a workpiece 1.

The engravement portion softening mechanism 6 includes a laser oscillator 61 which generates a laser beam and a first optical system 62 which includes one or more of condensers. The first optical system 62 is provided at an output portion of the laser oscillator 61 and condenses a laser beam 7 from the laser oscillator 61 onto the engravement portion of the workpiece 1 so as to soften the engravement portion. Moreover, the first optical system 62 of this embodiment is set to condense the laser beam 7 which is set to permit focusing an output energy of about 1 Joule at a wavelength of approximately 1000 nm onto the engravement portion of the workpiece 1 in diameter of about 0.3 to 0.6 mm. The output energy and the wavelength described above may be set suitably in accordance with a variety of the workpieces.

The engravement portion softening mechanism 6 is set to be inclined towards the pen 3, so the laser beam 7 is irradiated in the inclining direction towards the pen 3. Moreover, the engravement portion softening mechanism 6 is provided at the middle position of the pen 3 through a supporter 8 so as to be movable together with the pen 3 in the parallel direction to the engravement surface of the workpiece 1. Moreover, the engravement portion softening mechanism 6 is set to condense the laser beam 7 onto the engravement portion, when the pen 3 is separated from the engravement surface of the workpiece 1. In contrast, the engravement portion softening mechanism 6 is set to stop the irradiation of the laser beam 7, when the pen 3 approaches to the engravement surface. Therefore, the engravement portion softening mechanism 6 can condense the laser beam in constant diameter onto the engravement surface of the workpiece 1, so as to engrave the desired figures without effecting on the pen tip 2.

Moreover, in place of the first optical system described above, the engravement portion softening mechanism 6 may include a second optical system which includes one or more of condensers and an optical fiber. The condenser of the second optical system is provided at an output portion of the laser oscillator 61 though an optical fiber which is not shown, so that the laser beam 7 from the laser oscillator 61 is condensed onto the engravement portion thorough the optical fiber.

Next, a preferred method according to the present invention is described below with reference to a movement of the apparatus for engraving described above.

The pen tip 2 of the apparatus is set on the engravement portion of the engravement surface of the workpiece 1, and operation of the apparatus is then started. The pen 3 is then positioned at the engravement portion of the workpiece 1 by means of the positioning unit 5, and the pen tip 2 is then vibrated against the engravement portion at a high speed by means of the engraving vibration generator circuit 4, so that the desired figure is engraved on the engravement portion. At that time, the engravement portion is softened by being condensed by the laser beam 7 irradiated from the laser beam oscillator 61 of the engravement portion softening mechanism 6.

Therefore, it is possible to reduce wear and damage of the pen tip 2 by reducing friction between the workpiece and the pen tip arising from engraving, so as to prevent wear and damage in a short period of time, thus prolonging the useful life of the pen tip 2. Thus, the durability and the reliability of the apparatus are improved.

Figure 2:
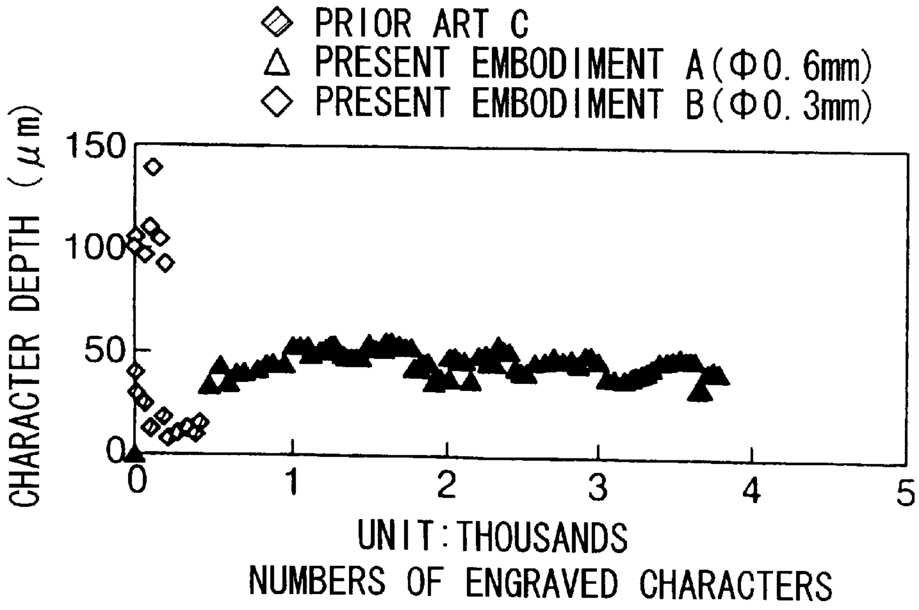
FIG. 2 is a graph showing measured data with respect to both the depth of indent and the number of engraved characters according to the present embodiments or the prior art.

FIG. 2 shows measured data with respect to both the depth and the number of engraved characters according to the present embodiments A and B which have the engravement portion softening mechanism 6 and the prior art C which does not have the engravement portion softening mechanism 6. In all of the present embodiments A and B, and the prior art C, the pen tip 2 used is made of a super hard metal (cemented carbide), and the workpiece 1 used is a tempered stainless steel having a Rockwell hardness (HRC) of approximately 65.

In FIG. 2, the depth of engraved characters according to the prior art C was initially as much as approximately 50 $\mu$m. However, the degree of the depth decreased relatively to the increase of the number of the engraved characters, and fell into the level in which the engraved characters could not be discriminated after the number of the engraved characters reached approximately 200 characters.

In contrast, the depth of engraved characters according to the present embodiment A, wherein the diameter of the condensed laser beam on the engravement portion of the workpiece 1 was set to approximately 0.6 mm, was initially as much as approximately 50 $\mu$m. Then, the degree of the depth maintained was substantially constant relative to the increase of the number of the engraved characters. Furthermore, even after the number of engraved characters reached more than 300, the degree of the depth maintained the level which the engraved characters were clearly discriminable. Moreover, the degree of the depth of engravement according to the present embodiment B, wherein the diameter of the condensed laser beam was set to approximately 0.3 mm, was initially more than twice that of the prior art C.

In view of the results shown in FIG. 2, it is anticipated that the present embodiments A and B require that the pen tip 2 of which the useful life for engraving is generally of the order of a few tens of thousands is to be applied for engraving more than 100 thousand of the characters until worn down to the same degree as that of the prior art C used for engraving approximately 200 characters. Thus, the present embodiments A and B reduced wear and damage of the pen tips 2, and could engrave characters distinctly for a long period of time, even if the workpieces 1 had the same hardness as the pen tip 2.

Thus, the apparatus of the present embodiment can achieve reliably the method described above, because the apparatus includes the engravement portion softening mechanism 6 for softening the engravement portion on the engravement surface of the workpiece 1 during engraving by the pen tip 2.

Furthermore, the engravement portion softening mechanism 6 can soften reliably and easily the engravement portion, because the engravement portion softening mechanism 6 includes either a first unit which includes the laser oscillator 61 and the first optical system 62 which condense the laser beam 7 from the laser oscillator 61 onto the engravement portion on the engravement surface of the workpiece 1 or the second unit which includes the laser oscillator 61 and the second optical system which condense the laser beam 7 from the laser oscillator 61 onto the engravement portion through an optical fiber.

Figure 3:
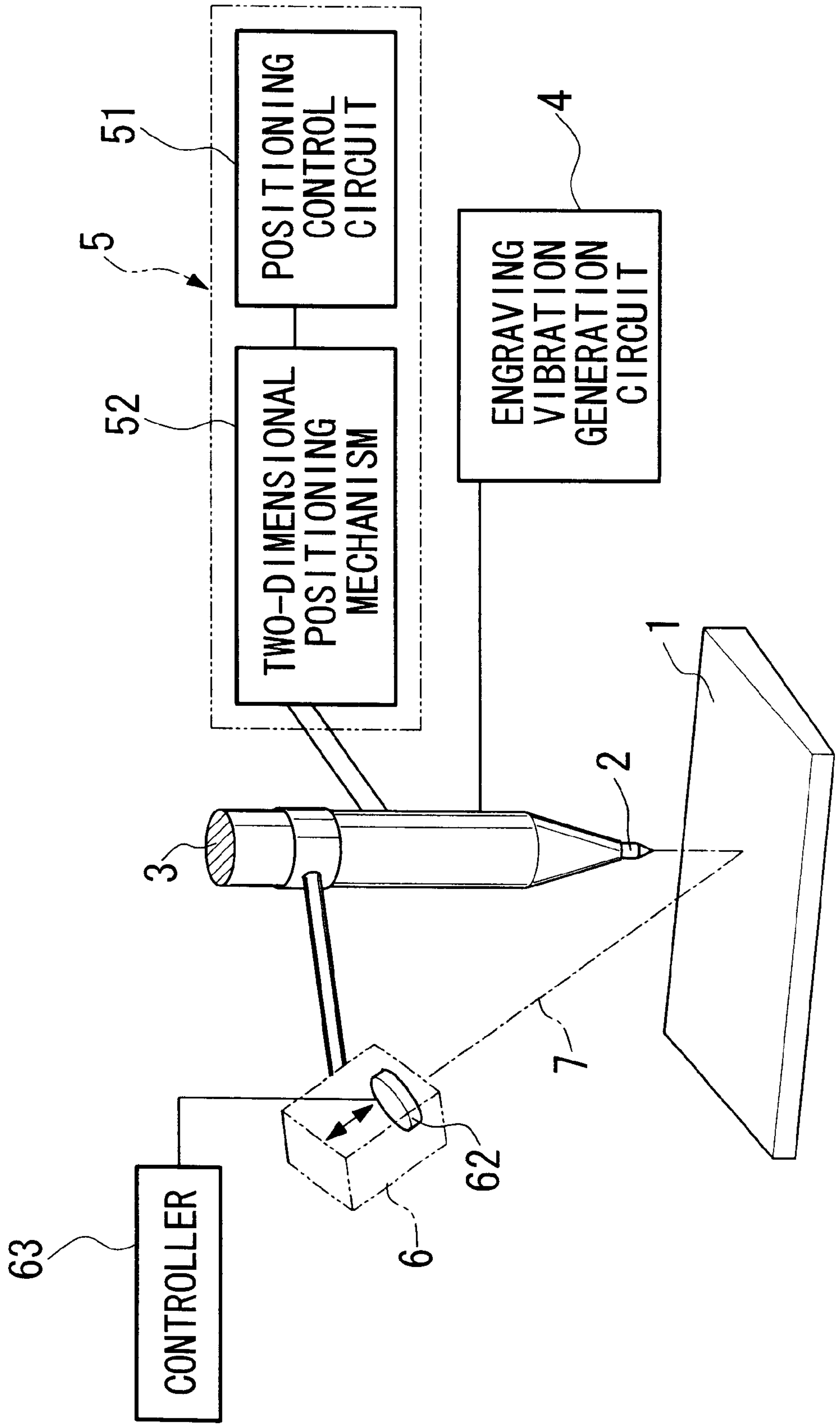
FIG. 3 is a block diagram showing another embodiment of an apparatus for engraving according to the present invention.

FIG. 3 shows another embodiment of an apparatus for engraving according to the present invention.

The differences of this apparatus shown in FIG. 3 from the apparatus shown in FIG. 1 are that the first optical system 62 of the engravement portion softening mechanism 6 is provided removably in the irradiation direction of the laser beam 7, and that a laser beam diameter controlling device is provided. The laser beam diameter controlling device includes a controller 63 which controls the position of the first optical system 62. Particularly, the controller 63 moves the first optical system 62 to approach to the engravement surface and condenses the laser beam 7 onto the engravement portion, when the pen 3 is separated from the engravement surface of the workpiece 1. In contrast, the controller 63 moves the first optical system 62 to be separated from the engravement surface and stop the irradiation of the laser beam 7, when the pen 3 approaches to the engravement surface. Therefore, a diameter of the laser beam irradiated onto the engravement portion of the workpiece 1 is controlled by the controller 63 so as to soften the engravement portion without effecting on the pen tip 2.

Another constitution of the apparatus shown in FIG. 3 is the same as that of the apparatus shown in FIG. 1 described above.

According to this embodiment, it is possible to obtain the same effects as that of the embodiments shown in FIG. 1 described above. Moreover, it is possible to select the diameter of the laser beam 7 condensed onto the engravement portion on the engravement surface of the workpiece 1 by controlling the position of the first optical system 62 by means of the laser beam diameter controlling device, so as to reduce the wear and the damage of the pen tip 2. Thereby, even if the workpiece 1 has the same or greater degree of hardness as the pen tip 2, the apparatus can be used for a long period of time for the purpose of engraving characters on the workpiece 1.

Although this embodiment shows that the first optical system 62 is configured to be removable by the controller 63, it is also possible to configure the laser oscillator 61 or the second optical system to be removable in order to enable control of the diameter of the laser beam 7 condensed on the workpiece 1 for obtaining the same effect described above.

What is claimed is:

1. A method for engraving on a workpiece by means of an apparatus which comprises a pen of which a tip is applied to a portion of the workpiece to be engraved and a positioning unit for moving the pen tip on a surface of the workpiece to be engraved, the method comprises:

softening the portion of the workpiece to be engraved; and vibrating the pen tip against the workpiece which is softened.

2. A method for engraving according to claim 1, wherein the portion of the workpiece to be engraved is softened by irradiation of a laser beam.

3. An apparatus for engraving which comprises a pen of which a tip is applied to a portion of a workpiece to be engraved, a positioning unit for moving the pen tip on a surface of the workpiece, and an engravement portion softening device which lowers hardness of the portion of the workpiece to be engraved.

4. An apparatus for engraving according to claim 3, wherein the engravement portion softening device comprises a laser oscillator and a first optical system which condenses a laser beam from the laser oscillator onto the portion of the workpiece to be engraved.

5. An apparatus for engraving according to claim 3, wherein the engravement portion softening device comprises a laser oscillator and a second optical system which, through an optical fiber, condense a laser beam from the laser oscillator onto the portion of the workpiece to be engraved.

6. An apparatus for engraving according to claim 4, wherein any one of either the laser oscillator, or the first or the second optical system is configured to be removable in the irradiation direction of the laser beam, and is provided a laser beam diameter controlling device to control a diameter of the laser beam condensed onto the portion of the workpiece to be engraved.

7. An apparatus for engraving according to claim 6, wherein the laser beam diameter controlling device includes a controller which can control a position of the first or the second optical system.

8. An apparatus for engraving according to claim 5, wherein any one of either the laser oscillator, or the first or the second optical system is configured to be removable in the irradiation direction of the laser beam, and is provided a laser beam diameter controlling device to control a diameter of the laser beam condensed onto the portion of the workpiece to be engraved.

* * * * *